(12) United States Patent
Quakkelaar

(10) Patent No.: US 11,061,909 B2
(45) Date of Patent: Jul. 13, 2021

(54) GENERATING A SINGLE TRANSACTIONAL DATA STREAM FROM MULTIPLE DATABASE LOGS

(71) Applicant: SAP SE, Walldorf (DE)

(72) Inventor: Rene Quakkelaar, Ter Aar (NL)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 16/040,309

(22) Filed: Jul. 19, 2018

(65) Prior Publication Data

US 2020/0026789 A1   Jan. 23, 2020

(51) Int. Cl.
- *G06F 7/00* (2006.01)
- *G06F 16/00* (2019.01)
- *G06F 16/2455* (2019.01)
- *G06F 16/27* (2019.01)
- *G06F 16/23* (2019.01)

(52) U.S. Cl.
CPC .... *G06F 16/24568* (2019.01); *G06F 16/2308* (2019.01); *G06F 16/2358* (2019.01); *G06F 16/24552* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 8,868,504 B2 * | 10/2014 | Aranha | G06F 16/21 707/640 |
| 2004/0098425 A1 * | 5/2004 | Wiss | G06F 16/275 |
| 2007/0300013 A1 * | 12/2007 | Kitamura | G06F 11/1471 711/114 |
| 2016/0299934 A1 * | 10/2016 | Karandikar | G06F 16/248 |
| 2016/0335278 A1 * | 11/2016 | Tabaaloute | G06F 16/184 |
| 2017/0351585 A1 * | 12/2017 | Bourbonnais | G06F 16/27 |

* cited by examiner

*Primary Examiner* — Tuan A Pham
(74) *Attorney, Agent, or Firm* — Sterne, Kessler, Goldstein & Fox P.L.L.C.

(57) ABSTRACT

Disclosed herein are system, method, and computer program product embodiments for generating a single transaction data stream from multiple database logs. An embodiment operates by assigning a first unique identifier to a first log entry associated with a disk store, a second unique identifier to a second log entry associated with in an in memory row store, and a third unique identifier to a third log entry based on the second unique identifier. The embodiment further operates by determining a first stream package based on the first log entry, a second stream package based on the third log entry, and a replay order for the first stream package and the second stream package based on the unique identifiers. In some embodiments, the operation further includes sending the first stream package and the second stream package to a replicant server in accordance with the replay order.

7 Claims, 5 Drawing Sheets

GENERATING A SINGLE TRANSACTIONAL DATA STREAM FROM MULTIPLE DATABASE LOGS

BACKGROUND

Some database management systems have adopted advancements that permit particular database objects to reside in non-volatile memory. Generally, these database management systems maintain separate page logs for database operations performed over database objects residing in disk-based storage, and database operations performed over database objects residing in memory row storage. However, replicant servers are not currently adapted to perform log replay over multiple database logs and replay transactions in the originally committed order.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a replication system with support for in-memory row storage (IMRS) enabled database objects.

Figure 1:
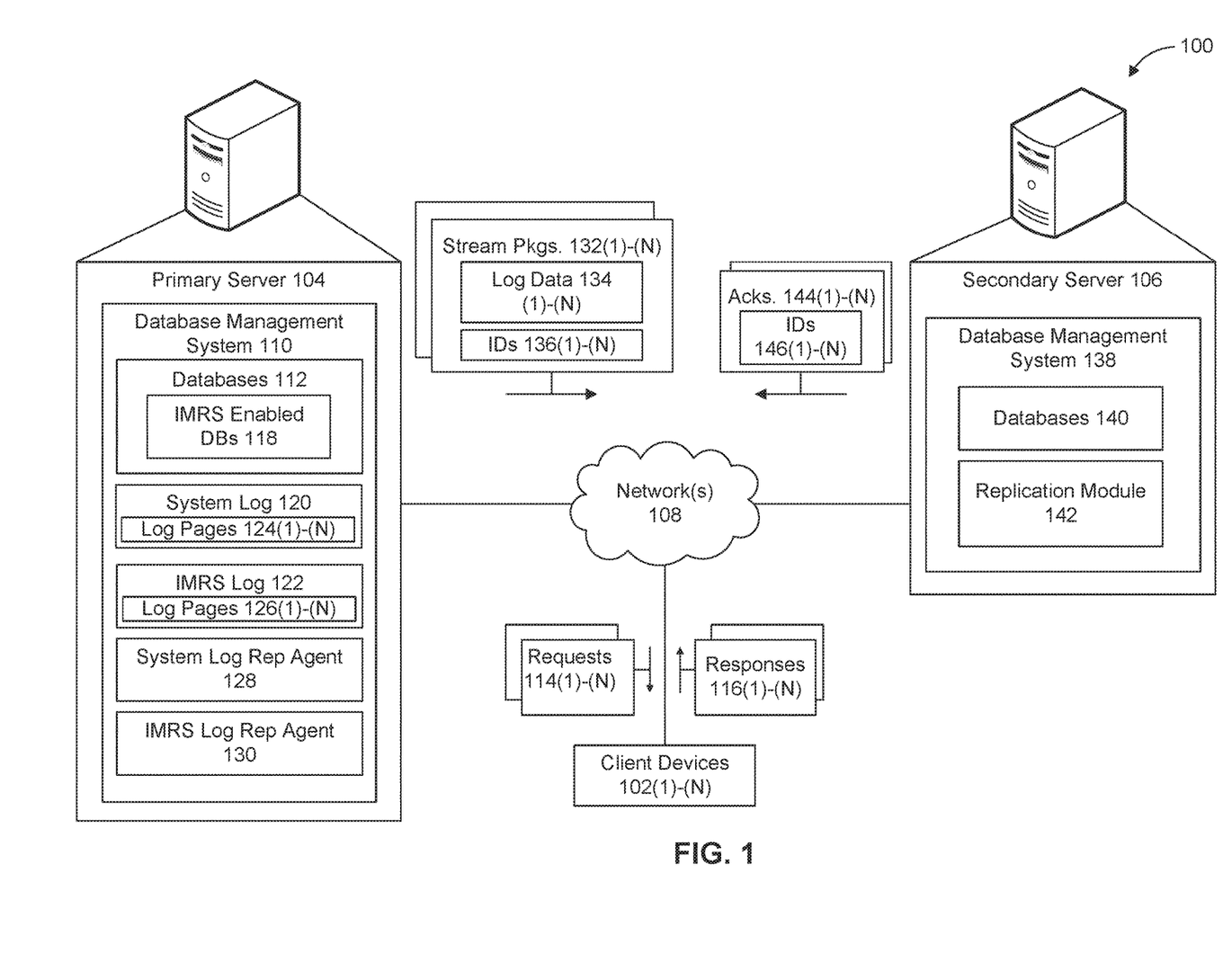
FIG. 1 is a block diagram of a replication system with support for in-memory row storage enabled database objects, according to some embodiments.

FIG. 1 illustrates an example embodiment of a replication system 100 with support for in-memory row storage (IMRS) enabled database objects. As referred to herein, an IMRS enabled database object includes a database object that resides in-memory until it is saved to disk memory upon a commit. For example, a database management system may perform multiple operations on an IMRS row within memory, and the final instance of the IMRS row will be saved to disk memory on commit. Consequently, the result of database operations performed on the IMRS database object during a transaction may only be written to disk memory on commit. As illustrated in FIG. 1, the replication system 100 includes a plurality of client devices 102(1)-(N), a primary server 104, and a secondary server 106. In the replication system 100, the primary server 104 and the secondary server 106 are configured for disaster recovery. For instance, the primary server 104 is an active node, while the secondary server 106 is a replication server that replicates the data of the primary server 104 within the replication system 100. In some embodiments, the secondary server 106 will become the active node if the primary server 104 fails.

The plurality of client devices 102(1)-(N), the primary server 104, and the secondary server 106 may communicate via a communication network(s) 108. The communication network(s) 108 may include any or all of a private network, personal area network (PAN), Local-Area Network (LAN), Wide-Area Network (WAN), or the Internet. Further, the connection between any of the plurality of client devices 102(1)-(N), the primary server 104, and the secondary server 106, and the communication network(s) 108 may be a wireless connection (e.g., Bluetooth, Wi-Fi connection, etc.), or a wired connection (e.g., Ethernet, universal serial bus (USB), etc.), or a combination thereof.

The primary server 104 may include a database management system 110 that includes one or more databases 112. A "database" as used herein refers to an organized collection of data. In some embodiments, the individual databases 112 may include a plurality of data tables comprising data values (e.g., alphanumeric strings, integers, decimals, floating points, dates, times, binary values, Boolean values, and/or enumerations). Some examples of the databases 112 include columnar databases, relational databases, key-store databases, graph databases, and document stores.

Additionally, the client devices 102(1)-(N) may send requests 114(1)-(N) to the database management system 110, and receive responses 116(1)-(N) from the database management system 110. In response to receipt of the requests 114(1)-(N), the database management system 110 may perform database operations on the databases 112. Further, the database management system 110 may determine the responses 116(1)-(N) based at least in part on the database operations, and send the responses 116(1)-(N) to the client devices 102(1)-(N).

For example, the client device 102(1) may send a request 114(1) for data from the databases 112. Further, the database management system 110 may perform a query to identify the data associated with the request 114(1), and return the identified data in the response 116(1). In some embodiments, the client devices 102(1)-(N) are only able to communicate with the primary server 104. For example, the client devices 102 may be unable to send the requests 114(1)-(N) to the secondary server 106 or receive the responses 116(1)-(N) from the secondary server 106.

As illustrated in FIG. 1, the databases 112 may include one or more IMRS enabled databases 118. In some embodiments, the IMRS enabled databases 118 include one or more database objects (e.g., data tables) that reside in main memory (e.g., an IMRS cache) of the primary server 104, in addition to including other database objects that reside in a disk-based storage of the primary server 104. In embodiments, access and retrieval of database objects in main memory is faster and provides more predictable performance in comparison to disk-based access and retrieval. Thus, a database object may be stored in the IMRS cache to increase performance of the database management system 110 when accessing or manipulating the database object. In some embodiments, the database management system 110 or a database management system administrator may request that a database or database object be stored in IMRS cache for increased performance. For example, the database management system 110 may request that a frequently accessed data table of the IMRS enabled database 118(1) be stored in the IMRS for more efficient performance of database operations.

As illustrated in FIG. 1, the database management system 110 may include system log information 120 and IMRS log information 122. The system log information 120 may record changes to the databases 112 and the IMRS enabled databases 118 resulting from database operations executed over database objects stored on disk-based storage of the primary server 104. In some embodiments, the database management system 110 may record the database operations within the system log information 120 as the database operation is executed. In addition, the system log information 120 may act as a storage repository from which the database objects of the databases 112 and the IMRS enabled databases 118 are re-instantiated during a recovery operation.

In some embodiments, the system log information 120 includes a plurality of system log pages 124(1)-(N). Further, the system log pages 124(1)-(N) may include log entries that record database operations performed on the databases 112 and the IMRS enabled databases 118. For instance, the system log page 124(1) may include log entries that log database operations performed on the IMRS enabled database 118(1). In particular, the system log page 124(1) may log database operations executed with respect to database objects of the IMRS enabled database 118(1) residing in disk-based disk storage of the primary server 104. Some examples of database operations include table management (e.g., inserting and deleting tables), read operations, delete operations, insert operations, update operations, and other types of database operations. In some examples, individual log entries may page the date and time of a database operation, the type of operation being performed, the column of the table being read or modified, and the value being inserted or modified.

The IMRS log information 122 may record changes to the IMRS enabled databases 118 resulting from committed transactions to the database objects of the IMRS enabled databases 118(1)-(N) stored in the IMRS of the primary server 104. Additionally, the IMRS log information 122 may act as a storage repository from which the database objects stored in the IMRS are re-instantiated during a recovery operation. In some embodiments, the IMRS log information 122 may include a plurality of IMRS system log pages 126(1)-(N). Further, the IMRS system log pages 126(1)-(N) may include log entries that record database operations resulting from committed transactions performed on the IMRS enabled databases 118. For instance, the IMRS system log page 126(1) may include log entries logging database operations associated with a committed transaction performed on the IMRS enabled database 118(1). In particular, the log entries of the IMRS system log page 126(1) may correspond to database operations executed over a data table of the IMRS enabled database 118(1) that resides in the IMRS of the primary server 104.

As illustrated in FIG. 1, the database management system 110 may further include a system log replicant agent 128 and an IMRS log replicant agent 130. Although two replicant agents (i.e., system log replicant agent 128 and an IMRS log replicant agent 130) are shown in FIG. 1, the embodiments described herein are applicable to any number of replicant agents. In some embodiments, individual replicant agents may be associated with individual execution threads. Further, the system log replicant agent 128 and the IMRS log replicant agent 130 may work in parallel to generate a single data stream of replication data (i.e., the stream packages 132(1)-(N)) used by the secondary server 106 to replicate the primary server 104. In some embodiments, the system log replicant agent 128 and the IMRS log replicant agent 130 coordinate so that the data stream appears to the secondary server 106 as if it is generated from a single log page instead of a plurality of log pages (i.e., the system log pages 124(1)-(N) and the IMRS system log pages 126(1)-(N)), thereby permitting the database management system 110 to perform a replication process with respect to the databases 112 without having to modify the operation of the secondary server 106.

As a part of the replication process performed by the primary server 104, the system log replicant agent 128 scans the system log information 120, generates stream packages 132(1)-(N) based on the system log pages 124(1)-(N), and transmits the stream packages 132(1)-(N) to the secondary server 106. For example, the system log replicant agent 128 may scan the system log page 124(1) corresponding to the IMRS enabled database 118(1), generate the stream package 132(1) based at least in part on log entries of the system log page 124(1), and transmit the stream package 132(1) to the secondary server 106. As described in further detail herein, the secondary server 106 may use the stream package 132(1) to replicate disk-based data objects of the IMRS enabled database 118(1) of the primary server 104.

As another part of the replication process, the IMRS log replicant agent 130 scans the IMRS log information 122, generates stream packages 132(1)-(N) based on the IMRS system log pages 126(1)-(N), and transmits stream packages 132(1)-(N) to the secondary server 106. For example, the IMRS log replicant agent 130 may scan the IMRS log page 126(1) corresponding to the IMRS enabled database 118(1), generate the stream package 132(2) based at least in part on log entries of the IMRS log page 126(1), and transmit the stream package 132(2) to the secondary server 106. As described in further detail herein, the secondary server 106 may use the stream package 132(2) to replicate data objects of the IMRS enabled database 118(1) residing in the IMRS of the primary server 104.

Although two log pages (i.e., the system log page 124(1) and the IMRS log page 126(1)) may be used to replicate the IMRS enabled database 118(1) at the secondary server 106, the embodiments described herein are applicable to any number of log pages.

As illustrated in FIG. 1, the stream packages 132(1)-(N) may include log data 134(1)-(N) that includes log information that may be replayed and executed by the secondary server to replicate the databases 118, and identifiers 136(1)-(N) corresponding to the log data 134(1)-(N). In some embodiments, the log data 134(1)-(N) may include database commands corresponding to the changes logged by the log pages (e.g., the system log pages 124(1)-(N) and the IMRS log pages 126(1)-(N)) over the databases 118. For example, the log data 134(1) may include the log entries of the system log page 124(1). Further, the identifiers 136 (1)-(N) may include individual identifiers associated with the individual log entries.

In some embodiments, each individual identifier 136 may be a unique identifier of the log entry amongst the log entries of the log pages (i.e., the system log pages 124(1)-(N) and the IMRS log pages 126(1)-(N)). For example, the identifier may include at least one of a log page identifier identifying the system log page associated with the log entry, a timestamp, and log entry identifier identifying the sequential order of the log entry among other log entries of the log page containing the log entry. Further, the individual identifiers may be increasing and repeatable. In other words, repeating the replication process over the log pages would produce the same identifiers for the individual log entries of the log pages.

In some other examples, the identifier may be a thirty-four byte value that reserves two bytes for a generation number, six bytes for a timestamp corresponding to the log page, four bytes for an identifier of the log page, two bytes for an identifier of the row (i.e., the sequential order of the log entry) within log page, fourteen bytes for transaction information, two bytes for IMRS log identifier, and two unused bytes. In yet still some other examples, the identifier may include log page timestamp information, a log page number, a log page row, log page row transaction information, log page number transaction information, transaction timestamp information, or an identifier identifying an order of execution of the database operation amongst a plurality of database operations. By including a combination of a timestamp, page-number, and row-number, the identifiers 136(1)-(N) may uniquely identify a log-record within a database management system. As referred to herein, a timestamp value may be a unique temporal reference within the database management system.

Further, in some embodiments, the system log replicant agent 128 and the IMRS log replicant agent 130 may perform a synchronization process to ensure that the stream packages 132(1)-(N) are sent according to the order the corresponding log entries were performed at the primary server 104. For example, the system log replicant agent 128 and the IMRS log replicant agent 130 may ensure that the stream package 132(1) corresponding to a first transaction is sent to the secondary server before the stream package 132(2) corresponding to a second transaction when the first transaction was committed earlier than the second transaction at the primary server 104.

As described in detail herein, the system log replicant agent 128 and the IMRS log replicant agent 130 may coordinate the generation and transmission of the stream packages 132(1)-(N) based at least in part on sharing state information. For example, the system log replicant agent 128 may provide the IMRS log replicant agent 130 with state information indicating a log entry of the system log pages 124(1)-(N) currently being scanned by the system log replicant agent 128. In addition, the IMRS log replicant agent 130 may provide the system log replicant agent 128 with state information indicating a log entry of the IMRS system log pages 126(1)-(N) currently being scanned by the IMRS log replicant agent 130. Further, the system log replicant agent 128 and the IMRS log replicant agent 130 may use the shared state information to determine which of the agents is responsible for sending the next stream package 132 to the secondary server 106.

As illustrated in FIG. 1, the secondary server 106 may include a database management system 138. Further, the database management system 110 may include one or more databases 140 and a replication module 142. In some embodiments, the individual databases 140 may include a plurality of data tables comprising data values (e.g., alphanumeric strings, integers, decimals, floating points, dates, times, binary values, Boolean values, and/or enumerations). Some examples of the databases 140 include columnar databases, relational databases, key-store databases, graph databases, and document stores.

In some embodiments, the replication module 142 receives the stream packages 132(1)-(N) from the primary server, and replicates the databases 112(1)-(N) and the IMRS enabled databases 118(1)-(N) as the databases 140(1)-(N). For example, the replication module 142 may perform a log replay over the log information contained in the stream packages 132(1)-(N). A "log replay" as used herein refers to identifying database operations recorded in a database log, and re-executing the database operations to achieve an intended state of the database. Further, the replication module 142 may discard a stream package 132 if the identifiers 136 of the stream package 132 are stale. For example, if the replication module 142 receives the stream package 132(1) after it receives the stream package 132(2), the replication module 142 may discard the stream package 132(1) without performing a replay using the log data 134(1) based at least in part on determining that the identifiers 136(1) of the stream package 132(1) are older than the identifiers 136(2) of the stream package 132(2).

Further, the replication module sends the acknowledgements 144(1)-(N) to the system log replicant agent 128 and the IMRS log replicant agent 130 indicating that the replication module 142 has processed the stream packages 132(1)-(N). In some embodiments, individual acknowledgements 144 correspond to individual stream packages 132. For example, the replication module 142 may send the acknowledgement 144(1) to the database management system 110 indicating that the replication module 142 has processed the stream package 132(1), the acknowledgement 144(N) to the database management system 110 indicating that the replication module 142 has processed the stream package 132(N), and so forth.

Additionally, the acknowledgements 144(1)-(N) may include the identifiers 146(1)-(N). As such, the system log replicant agent 128 and the IMRS log replicant agent 130 may determine which log entries have been replayed based at least in part on the identifiers 146(1)-(N) received in the acknowledgements 144(1)-(N). In some embodiments, if the system log replicant agent 128 or the IMRS log replicant agent 130 do not receive an acknowledgement with all of the identifiers corresponding to a stream package 132, the system log replicant agent 128 or the IMRS log replicant agent 130 may resend the stream package 132 or perform another corrective action (e.g., restarting the scan of the system log 120 and the IMRS log 122). Additionally, the replication module 142 may discard data received in previously received stream packages 132 based on the identifiers 146(1)-(N).

Figure 2:
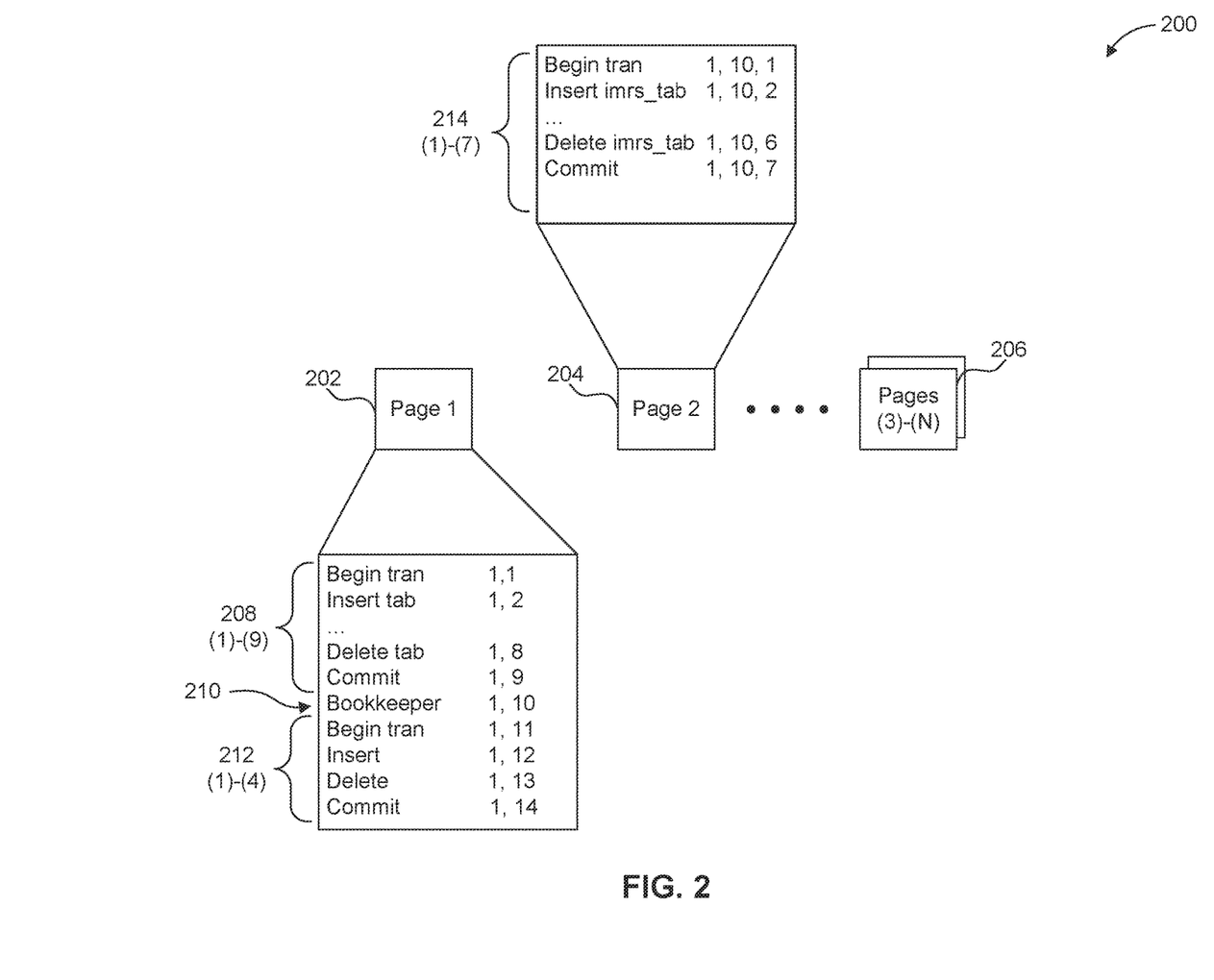
FIG. 2 is a block diagram illustrating example log information, according to some embodiments.

FIG. 2 is a block diagram illustrating example log information, according to some embodiments. In some embodiments, the pages of log information may correspond to individual log pages of the system log pages 124(1)-(N) and the IMRS system log pages 126(1)-(N). For instance, FIG. 2 illustrates a page 202 of the system log pages 124(1)-(N), a page 204 of the IMRS system log pages 126(1)-(N), and a plurality of other pages 206(1)-(N) of log pages (i.e., the system log pages 124(1)-(N) and the IMRS system log pages 126(1)-(N)).

As illustrated in FIG. 2, page 202 includes log entries 208(1)-(9), a placeholder log entry 210, and log entries 212(1)-(4) corresponding to database operations performed by a database management system (e.g., the database management system 110) over database objects. For example, page 202 may correspond to database operations performed over a data table of the IMRS enabled database 118(1). In particular, the log entries 208(1)-(N) and 212(1)-(4) may correspond to database operations performed on one or more data tables of the IMRS enabled database 118(1) residing in disk-based storage of the primary server 104.

Additionally, page 204 includes log entries 214(1)-(7) corresponding to database operations performed during a committed transaction by the database management system 110 over database objects stored in IMRS. For example, page 204 may correspond to committed database operations performed over the IMRS enabled database 118(1). In particular, the log entries 214(1)-(7) may correspond to committed database operations performed on one or more data tables of the IMRS enabled database 118(1) residing in the IMRS of the primary server 104.

In some embodiments, the placeholder log entry 210 acts as a placeholder for one or more committed database operations performed on one or more data tables of the IMRS enabled database 118(1) residing in IMRS of the primary server 104. In some embodiments, the placeholder log entry 210 is a no operation instruction (i.e., a no-op). Given that the database operations associated with the placeholder log entry 210 are performed on data tables residing in the IMRS, the database operations associated with placeholder log entry 210 are logged in page 204. For example, the log entries 214(1)-(7) may correspond to the placeholder log entry 210.

As such, when a system log replicant agent (e.g., the system log replicant agent 128) scans the placeholder log entry 210, the system log replicant agent 128 will be aware that the log entries 212(1)-(4) following the placeholder log entry 210 should be sent to the secondary server (e.g., the secondary server 106) in a stream package (e.g., the stream package 132(3)) after the IMRS log replicant agent 130 sends a stream package (e.g., the stream package 132(2)) corresponding to the log entries 214(1)-(7).

As described in detail above, each of the log entries 208, 210, 212, and 214 may be associated with an identifier. For example, the first log entry 208(1) is associated with the identifier value including the string "1.1," which indicates that the log entry 208(1) is the first log entry of the first log page 202 logged by the database management system. In some embodiments, the identifier may further include a timestamp indicating the time and/or date that the corresponding database operation was performed.

Further, the identifiers may encode the relationship between the placeholder log entry 210 and the log entries 214(1)-(7). As illustrated in FIG. 2, the identifier of the placeholder log entry 210 may be used to determine the identifiers of the log entries 214(1)-(7). In particular, the identifiers of the log entries 214(1)-(7) may be determined using a combination of the identifier of the placeholder log page 210 and an identifier of the sequential order of the log entry 214 among other log entries 214(1)-(7) of the log page 204 containing the log entry 214.

For example, in response to the database management system 110 performing the commit associated with the log entry 214(7), the database management system may record the placeholder log entry 210 within the page 202. Further, the database management system 110 may associate the place holder log entry 210 with the identifier value "1.10". Additionally, database management system may associate the log entry 214(1) with the identifier value "1.10.1," thus indicating that log entry 214(1) is the first log entry of the log entries 214(1)-(7) associated with the placeholder log entry 210.

Further, the system log replicant agent 128 and the IMRS log replicant agent 130 can determine that the log entries 214(1)-(7) should be replayed after the log entries 208(1)-(9) based on comparing the identifier values "1,1" and "1,9" corresponding to the log entries 208(1)-(9) to the prefix "1.10" of the identifier values corresponding to the log entries 214(1)-(7). Additionally, the system log replicant agent 128 and the IMRS log replicant agent 130 can determine that the log entries 214(1)-(7) should be replayed before the log entries 212(1)-(4) based on comparing the identifier values "1,10" and "1,14" corresponding to the log entries 212(1)-(4) to the prefix "1.10" of the identifier values corresponding to the log entries 214(1)-(7). As described in detail herein, the system log replicant agent 128 and the IMRS log replicant agent 130 may use the determined replay order to determine the transmittal order of the stream packages 132(1)-(N).

Figure 3:
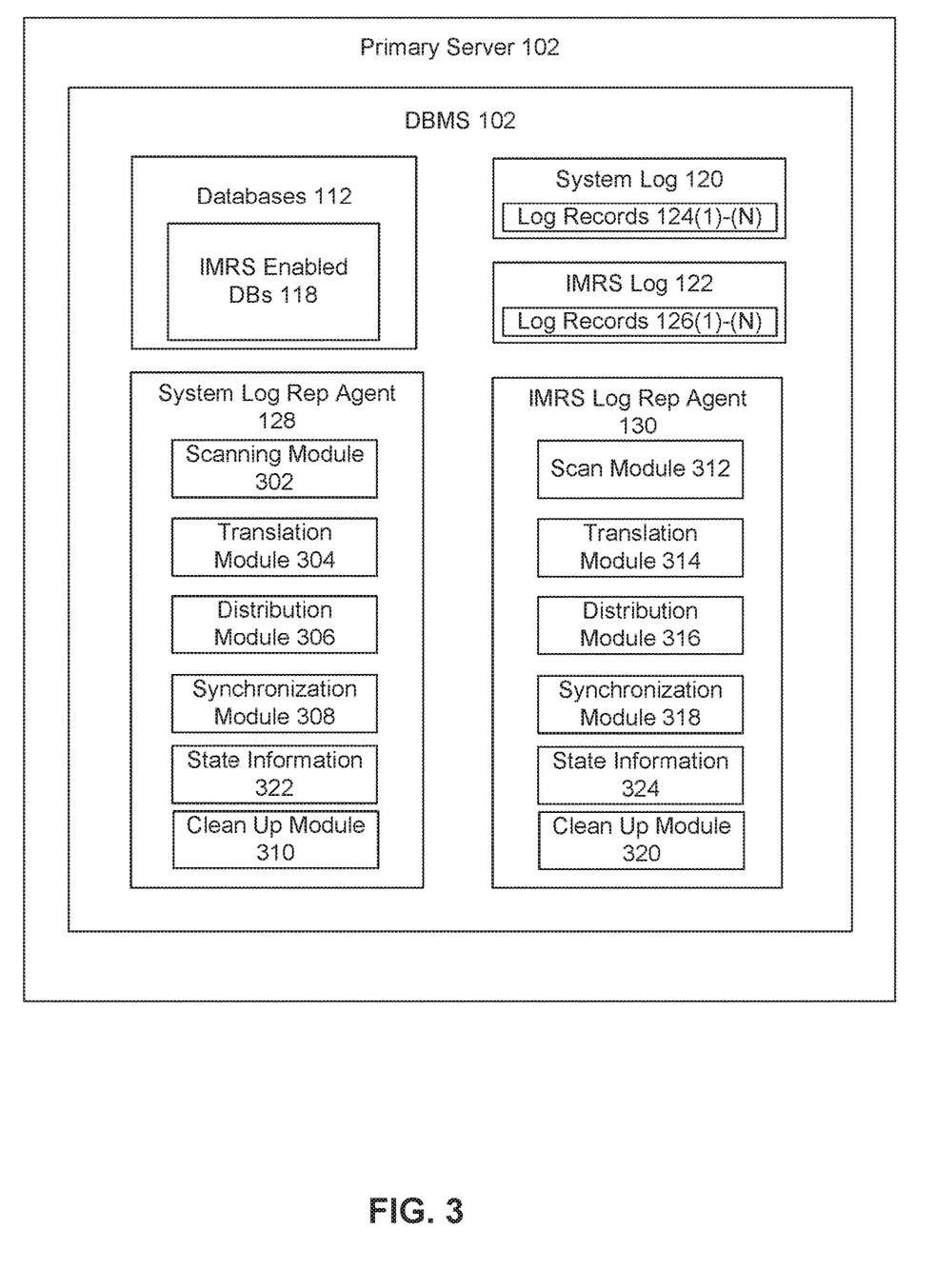
FIG. 3 is a block diagram illustrating an example primary server, according to some embodiments.

FIG. 3 is a block diagram illustrating an example primary server, according to some embodiments. As illustrated in FIG. 3, the primary server 104 includes the databases 118, the system log information 120, the IMRS log information 122, the system log replication agent 128, and the IMRS log replication agent 130.

The system log replicant agent 128 includes a scanning module 302, a translation module 304, a distribution module 306, a synchronization module 308, and a cleanup module 310. The scanning module 302 may scan the system log information 120. For example, the scanning module 302 may scan log entries of the log pages 124. Further, the scanning module 302 provides the scanned log entries to the translation module 304.

The translation module 304 modifies the scanned log entries by identifying the scanned log entries that are not command text, and translating the identified log entries of the log pages 124 to command text. For example, if the log entry 208(1) is non-command text (e.g., a data definition language (DDL) statement) as opposed to command text (e.g., a data manipulation language (DML) command), the translation module 304 may translate the log entry 208(1) into command text that can be executed by a replicant server (e.g., the secondary server 106) in order to replicate the change associated with the log entry 208(1) at the secondary server 106. Some examples of DDL statements include statements to create, modify, and remove database objects such as tables, indexes, and users. Some examples of DML statements include statements to store, modify, retrieve, delete and update data in a database. After the translation module 304 performs the translation, the translated log entry 208(1) is provided to the distribution module 306. If the log entry 208(1) is already command text, the translation module 304 does not need to perform a translation, and provides the log entry 208(1) to the distribution module 306.

The distribution module 306 may receive the log entries from the translation module 304, package the log entries into stream packages (e.g., 132(1)), and transmit the stream packages to the secondary server 106 in a data stream. In some embodiments, the data stream may include a TCP/IP connection formed between the primary server 104 and the secondary server 106. In addition, the distribution module 306 may send the stream packages as TCP/IP packets via the TCP/IP connection to the secondary server 106.

Further, in some embodiments, the distribution module 306 may ensure that the stream packages 132(1)-(N) are sent in sequential order to the secondary server 106. For example, the distribution module 306 may ensure that the stream package 132(1) corresponding to the log entries 208(1)-(N) is sent to the secondary server 106 before the stream package 132(2) corresponding to the log entries 214(1)-(N). In some embodiments, the distribution module 306 determines whether to send the stream package 132(1) based at least in part on the identifiers 146(1) associated with the stream package 132(1) and instructions received from the synchronization module 308.

The IMRS log replicant agent 130 includes a scanning module 312, a translation module 314, a distribution module 316, a synchronization module 318, and a cleanup module 320. The scanning module 302 may scan the IMRS log information 122. For example, the scanning module 312 may scan log entries of the log pages 126. Further, the scanning module 312 provides the scanned log entries to the translation module 314.

The translation module 312 modifies the scanned log entries by identifying the scanned log entries that are not command text, and translating the identified log entries of the log pages 126 to command text. For example, if the log entry 214(1) is non-command text (e.g., a data definition language (DDL) statement) as opposed to command text (e.g., a data manipulation language (DML) command), the translation module 304 may translate the log entry 214(1) into command text that can be executed by a replicant server (e.g., the secondary server 106) in order to replicate the change associated with the log entry 214(1) at the secondary server 106. After the translation module 312 performs the translation, the translated log entry 214(1) is provided to the distribution module 316. If the log entry 214(1) is already command text, the translation module 312 does not need to perform a translation, and provides the log entry 208(1) to the distribution module 316.

The distribution module 316 may receive the log entries from the translation module 312, package the log entries into stream packages (e.g., the stream package 132(2)), and transmit the stream packages to the secondary server 106 in a data stream. In some embodiments, the data stream may include a TCP/IP connection formed between the primary server 104 and the secondary server 106. In addition, the distribution module 316 may send the stream packages 132(1)-(N) as TCP/IP packets via the TCP/IP connection to the secondary server 106.

Further, in some embodiments, the distribution module 316 may ensure that the stream packages 132(1)-(N) are sent in sequential order to the secondary server 106. For example, the distribution module 316 may ensure that the stream package 132(2) corresponding to the log entries 214(1)-(N) is sent to the secondary server 106 after the stream package 132(2) corresponding to the log entries 208(1)-(N). In some embodiments, the distribution module 306 determines whether to send the stream package 132(2) based at least in part on the identifiers 146(2) associated with the 132(2) and instruction received from the synchronization module 318.

Additionally, the system log replication agent 128 and the IMRS log replication agent 130 may include the synchronization modules 308 and 318, respectively. Further, the synchronization modules 308 and 318 may coordinate the processes performed by the system log replication agent and the IMRS log replication agent to ensure that the stream packages 132(1)-(N) are transmitted to the secondary server based at least in part on the order in which the log entries of the log pages 124(1)-(N) and the log pages 126(1)-(N) are performed by the database management system 110.

In some embodiments, the synchronization modules 308 and 318 maintain state information 322 and 324, respectively. Further, the state information 322 may include the first identifier and last identifier associated with a current stream package 132(1) being generated by the system log replication agent 128. Additionally, as log entries from the system log pages 124(1)-(N) are added to the current stream package 132(1) being generated by the system log replication agent 128, the synchronization module 308 may update the state information 322. For example, the synchronization module 308 may update the state information 322 to indicate that the last log data 134(1) added to the current stream package 132(1) being generated by the system log replication agent 128 corresponded to the identifier "1,9".

Similarly, the state information 324 may include the first identifier and last identifier associated with the current stream package 132(2) being generated by the IMRS log replication agent 130. Further, as log entries from the IMRS system log pages 126(1)-(N) are added to the current stream package 132(2) being generated by the IMRS log replication agent 130, the synchronization module 308 may update the state information 324. For example, the synchronization module 318 may update the state information 324 to indicate that the last log data 134(2) added to the current stream package 132(2) being generated by the IMRS log replication agent 130 corresponded to the identifier "1,10,7".

Additionally, the synchronization modules 308 and 318 may determine the log data 134 the distribution modules 306 and 316 should pack into the stream packages 132. For example, the distribution module 306 may maintain an open stream package 132(1) and package the log entries 208(1)-(9) into the stream package 132(1). After the log entries 208(9) and the corresponding identifier "1,9" are packaged into the stream package 132(1), the synchronization module 308 may determine whether the distribution module 306 should add more log data 134(1) to the stream package 132(1) or seal the stream package 132(1) based at least in part on the state information 324. For example, if the first identifier of the current stream package 132(2) of the IMRS log replicant agent is "1,10,1", the synchronization module 306 may instruct the distribution module 306 to seal the stream package 132(1) given that the log entry 214(1) that needs to be replayed after the log entry 208(9) will be packed in the stream package 132(2). As another example, if the first identifier of the current stream package 132(2) of the IMRS log replicant agent is "1,13,1", the synchronization module 306 may instruct the distribution module 306 to add more log data 134(1) to the stream package 132(1) given that the log entry 214(1) that needs to be replayed after the log entry 208(9) will not be packed in the stream package 132(2).

Further, the synchronization modules 308 and 318 may determine when the distribution modules 306 and 316 should send stream packages 132 based on the state information 322 and 324. In some embodiments, the synchronization modules 308 and 318 may determine when to send a stream package 132(N) and when to wait for another replication agent to send its current stream package (N+1). For example, the synchronization module 308 may determine that the distribution module 306 should send the stream package 132(1) based at least in part on the last identifier (i.e., "1,9") of the stream package 132(1) being less recent than the first identifier (i.e., "1,10,1") of the stream package 132(2). As another example, the synchronization module 318 may determine that the distribution module 316 should wait to send the stream package 132(2) based at least in part on the last identifier (i.e., "1,9") of the stream package 132(1) being less recent than the first identifier (i.e., "1,10, 1") of the stream package 132(2).

Additionally, the synchronization modules 308 and 318 may exchange messages instructing each other to send a current stream package 132 or wait before sending a current stream package 132. For example, the synchronization module 318 may send the synchronization module 308 a message instructing the distribution module 306 to send the stream package 132(1) based at least in part on the last identifier (i.e., "1,9") of the stream package 132(1) being less recent than the first identifier (i.e., "1,10,1") of the stream package 132(2). As another example, the synchronization module 308 may send the synchronization module 318 a message instructing the distribution module 316 to wait before sending the stream package 132(2) based at least in part on the first identifier (i.e., "1,10,1") of the stream package 132(2) being more recent than the last identifier (i.e., "1,9") of the stream package 132(1).

Additionally, the system log replication agent 128 and the IMRS log replication agent 130 may include the cleanup modules 310 and 320, respectively. The cleanup modules 310 and 320 may truncate log pages (e.g., the system log pages 124(1)-(N) and the IMRS log pages 126(1)-(N)) based on acknowledgements (e.g., the acknowledgements 144(1)-(N)) received from the secondary server 106. For example, the system log replicant agent 128 may receive the acknowledgement 144(1) including the identifiers 146 corresponding to the identifiers 136(1) of the stream package 132(1), and truncate the log entries 208(1)-(9) within the log page 124(1) corresponding to the log data 134(1). As such, the cleanup modules 310 and 320 minimize the storage space utilized by the replication process of the primary server 104 by managing the size of the system log pages 124(1)-(N) and the IMRS log pages 126(1)-(N).

Figure 4:
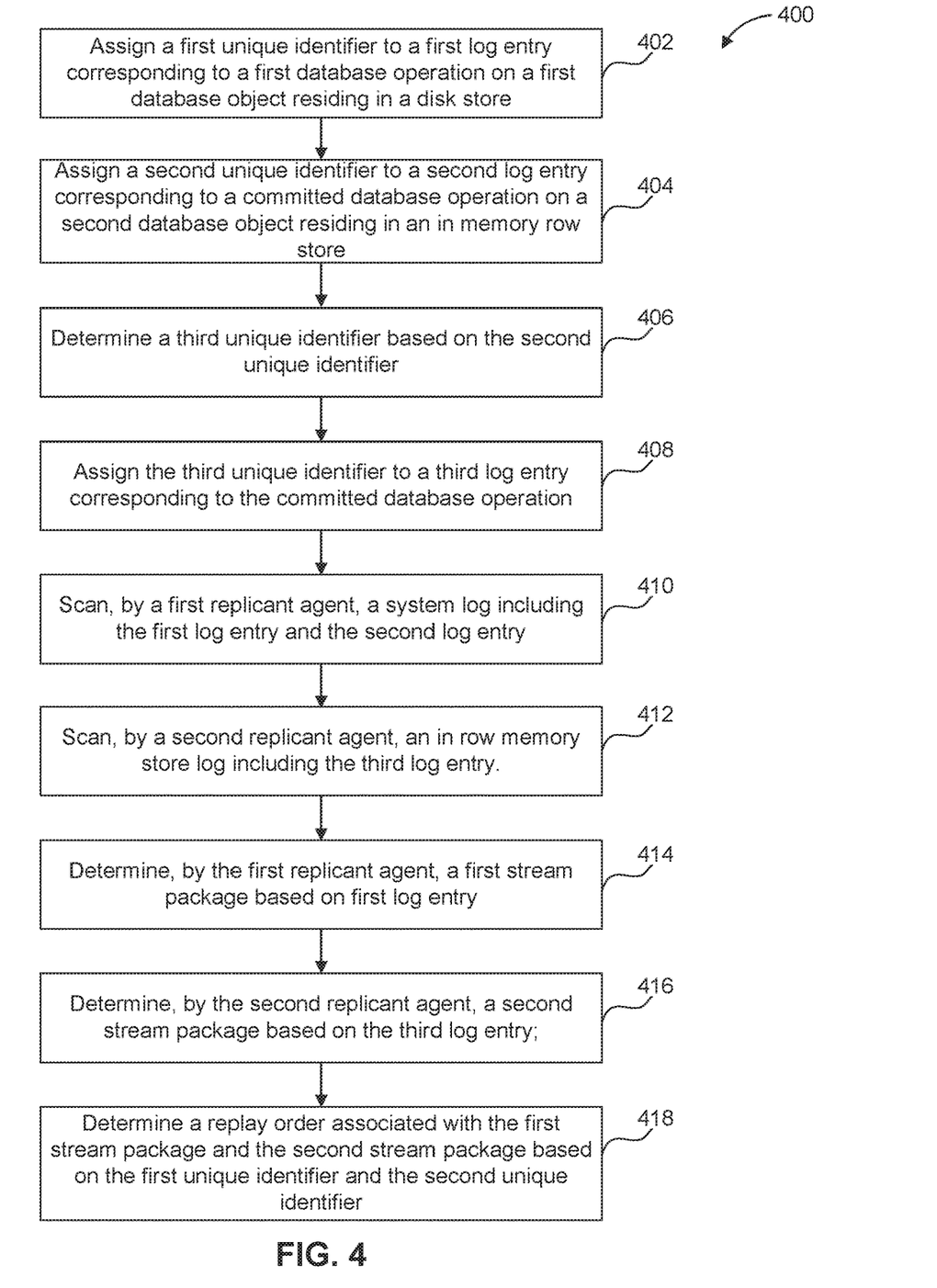
FIG. 4 is a flowchart illustrating a process for generating a single transaction data stream from multiple database logs, according to some embodiments.

FIG. 4 is a flowchart illustrating a process for generating a single transaction data stream from multiple database logs, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 200 is not limited to those example embodiments.

At 402, a primary server assigns a first unique identifier to a first log entry corresponding to a first database operation on a first database object residing in a disk store. For example, in the example of FIG. 2, the database management system 110 may perform database operations over a disk-based data table of the IMRS enabled database 118, and record the log entries 208(1)-(9) corresponding to the database operations to the log page 202(1). Further, the database management system 110 may associate unique identifiers (e.g., the identifiers 136) with the log entries 208(1)-(9). For instance, the database management system 110 may associate the unique identifier "1,1" with the log entry 208(1).

At 404, the primary server assigns a second unique identifier to a second log entry corresponding to a committed database operation on a second database object residing in an IMRS. For example, the database management system 110 may determine that the IMRS enabled database 118 is marked for replication and IMRS enabled. In addition, the database management system 110 may commit a transaction including database operations over a data table of the IMRS enabled database 118 residing in IMRS, and record the placeholder log entry 210 corresponding the database operations of the transaction to the log page 202(1). Further, the database management system 110 may associate a unique identifier (e.g., the identifiers 136) with the log entry 210. For instance, the database management system 110 may associate the unique identifier "1,10" with the log entry 210.

At 406, the primary server determines a third unique identifier based on the second unique identifier. For example, the database management system 110 may determine that the unique identifier "1,10" of the placeholder log entry 210 will be used as a prefix for the unique identifiers corresponding to log entries 214(1)-(7) of the database operations of the committed transaction.

At 408, the primary server assigns the third unique identifier to a third log entry corresponding to the committed database operation. For example, the database management system 110 may associate the unique identifier "1,10,1" with the log entry 214(1) corresponding to the first database operation of the committed transaction.

At 410, the primary server scans, by a first replicant agent, a system log including the first log entry and the second log entry. For example, the scanning module 302 may scan the log page 202 including the log entry 208(1) and the log entry 210.

At 412, the primary server scans, by a second replicant agent, an in row memory store log including the third log entry. For example, the scanning module 312 may scan the log page 204 including the log entry 214(1).

At 414, the primary server determines, by the first replicant agent, a first stream package based on first log entry. For example, the distribution module 306 may generate the stream package 132(1) including log data 134(1) associated with the log entry 208(1) and the unique identifier 136(1) "1,1" of the log entry 208(1).

In some embodiments, the translation module 304 may determine that the log entry 208(1) is non-command text, and translate the log entry 208(1) to command text. Further, the distribution module 306 may generate the stream package 132(1) including log data 134(1) associated with the translated log entry 208(1) and the unique identifier 136(1) "1,1" of the log entry 208(1).

At 416, the primary server determines, by the second replicant agent, a second stream package based on the third log entry. For example, the distribution module 316 may generate the stream package 132(2) including log data 134(2) associated with the log entry 214(1) and the unique identifier 136(2) "1,10,1" of the log entry 214(1).

In some embodiments, the translation module 314 may determine that the log entry 214(1) is non-command text, and translate the log entry 208(1) to command text. Further, the distribution module 316 may generate the stream package 132(2) including log data 134(2) associated with the translated log entry 214(1) and the unique identifier 136(2) "1,10,1" of the log entry 214(1).

At 418, the primary server determines replay order associated with the first stream package and the second stream package based on the first unique identifier and the second unique identifier. For example, the system log replicant agent 128 and/or the IMRS log replicant agent 130 may determine the order by which the stream package 132(1) and the stream package 132(2) should be sent to secondary server 106. In some embodiments, the system log replicant agent 128 and/or the IMRS log replicant agent 130 may determine the replay order based at least in part on comparing the unique identifiers 136(1) of the stream package 132(1) to the unique identifiers 136(2) of the stream package 132(2). For example, the system log replicant agent 128 and/or the IMRS log replicant agent 130 may determine that the stream package 132(1) should be replayed before the stream package 132(2) given that the last identifier value "1,9" of the stream package 132(1) is less recent than the first identifier value "1,10,1" of the stream package 132(2). Further, the system log replicant agent 128 and/or the IMRS log replicant agent 130 may send the stream packages 132(1) and 132(2) to the secondary server 106 in accordance with the determined replay order. For example, the synchronization modules 308 and 318 may access the state information 322 and 324 to determine when to transmit the stream packages 132(1) and 132(2) to the secondary server 106.

Figure 5:
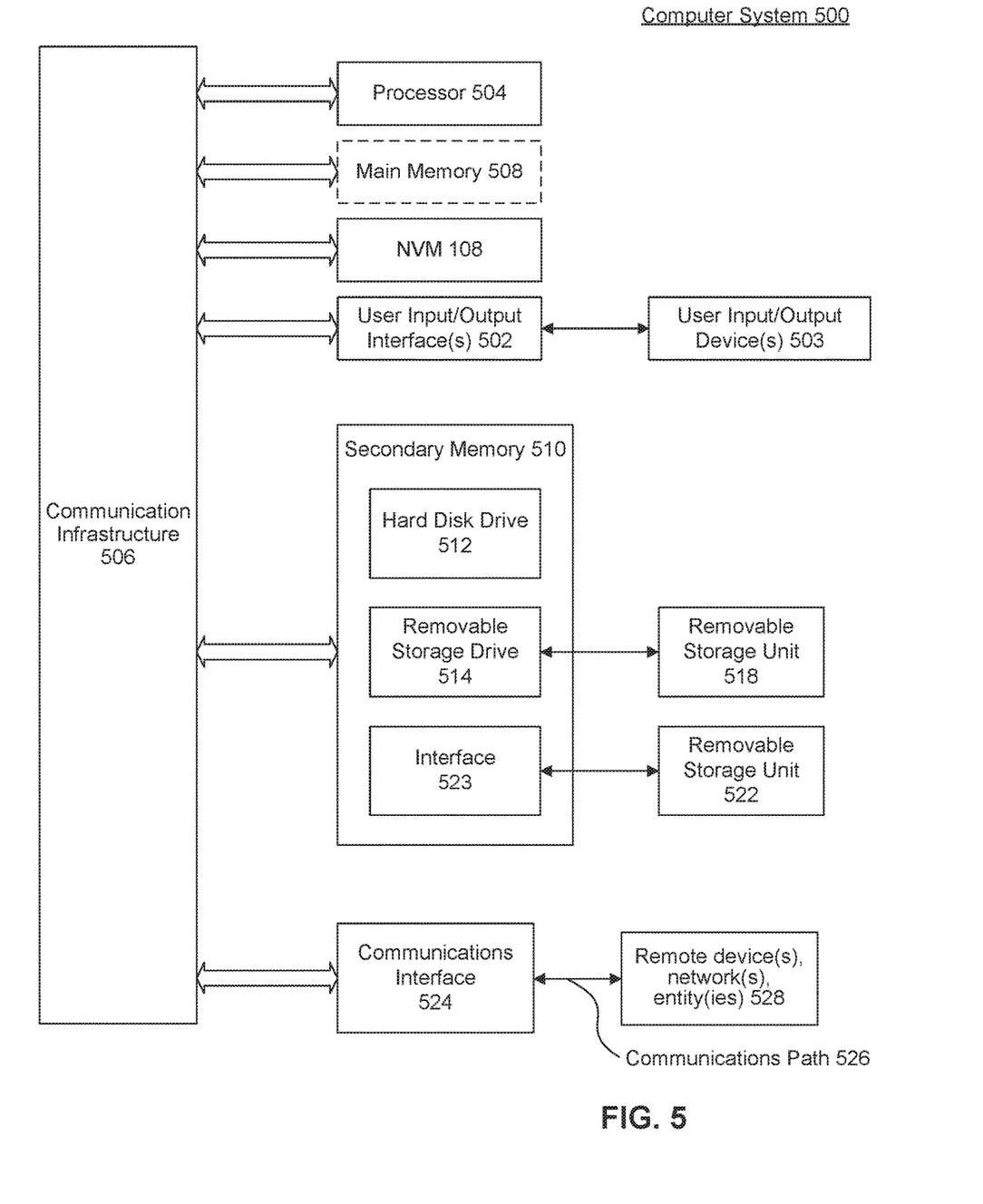
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data. In some embodiments, the main memory may comprise IMRS including database objects associated with an IMRS enabled database (e.g., IMRS enabled databases 118) as described herein.

Computer system 500 may also include one or more secondary storage devices or memory 510. Secondary memory 510 may include, for example, a hard disk drive 512 and/or a removable storage device or drive 514. In some embodiments, the secondary memory may include database objects associated with a database (e.g., the databases 112). Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for replicating an in memory row store (IMRS) enabled database, comprising:

scanning, by a first replicant agent, a system log including a first log entry corresponding to a first database operation on a first database object residing in a disk store and a second log entry corresponding to a committed database operation on a second database object residing in an in memory row store (IMRS);

scanning, by a second replicant agent, an IMRS log including a third log entry corresponding to the committed database operation;

determining, by the first replicant agent, a first stream package based on the first log entry; determining, by the second replicant agent, a second stream package based on the third log entry;

determining a replay order associated with the first stream package and the second stream package;

assigning a first unique identifier to the first log entry and a second unique identifier to the second log entry;

determining a third unique identifier based on the second unique identifier;

assigning the third unique identifier to the third log entry, wherein the determining the replay order associated with the first stream package and the second stream package comprises determining the replay order based on the first unique identifier and the second unique identifier;

sending the first stream package including the first unique identifier to a secondary database server based on the replay order; and sending the second stream package including the second unique identifier to the secondary database server based on the replay order.

2. The method of claim 1, further comprising:

receiving, from the secondary database server, a first acknowledgment including the first unique identifier; and receiving, from the secondary database server, a second acknowledgment including the second unique identifier.

3. The method of claim 1, wherein the first unique identifier comprises at least one of log page timestamp information, a log page number, a log page row, log page row transaction information, log page number transaction information, or transaction time stamp information.

4. The method of claim 1, wherein the third unique identifier comprises at least one of log page timestamp information, a log page number, a log page row, log page row transaction information, log page number transaction information, transaction time stamp information, or a fourth unique identifier identifying an order of execution of the committed database operation among a plurality of committed database operations.

5. The method of claim 1, further comprising:

determining that the IMRS enabled database has in row memory storage enabled; and determining that the IMRS enabled database has been marked for replication.

6. The method of claim 1, wherein the determining, by the first replicant agent, the first stream package based on the first log entry comprises:

determining a database command corresponding to the first database operation; and generating the first stream package based on the database command.

7. The method of claim 1, wherein the determining, by the second replicant agent, the second stream package based on the third log entry comprises:

determining a database command corresponding to the committed database operation;

and generating the second stream package based on the database command.

* * * * *